United States Patent
Sato et al.

(10) Patent No.: US 9,787,858 B2
(45) Date of Patent: Oct. 10, 2017

(54) NETWORK SYSTEM AND CONTROL METHOD OF A NETWORK SYSTEM

(71) Applicant: Seiko Epson Corporation, Tokyo (JP)

(72) Inventors: Katsuaki Sato, Shiojiri (JP); Naohiro Kaneko, Shiojiri (JP); Takashi Kawamori, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/192,305

(22) Filed: Jun. 24, 2016

(65) Prior Publication Data
US 2016/0381234 A1   Dec. 29, 2016

(30) Foreign Application Priority Data

Jun. 26, 2015  (JP) .................................. 2015-128781

(51) Int. Cl.
| | |
|---|---|
| *G06F 3/12* | (2006.01) |
| *H04N 1/00* | (2006.01) |
| *H04L 29/06* | (2006.01) |
| *G06K 15/02* | (2006.01) |
| *G06F 11/07* | (2006.01) |
| *G07G 1/14* | (2006.01) |

(Continued)

(52) U.S. Cl.
CPC ....... *H04N 1/00029* (2013.01); *G06F 11/079* (2013.01); *G06F 11/0733* (2013.01); *G06F 11/0772* (2013.01); *G06K 15/02* (2013.01); *G06K 15/022* (2013.01); *G06Q 20/202* (2013.01); *G07G 1/14* (2013.01); *H04L 67/42* (2013.01); *H04N 1/00015* (2013.01); *H04N 1/00084* (2013.01); *H04L 41/5064* (2013.01); *H04N 2201/0039* (2013.01); *H04N 2201/0072* (2013.01); *H04N 2201/0082* (2013.01)

(58) Field of Classification Search
USPC ....................................................... 358/1.15
See application file for complete search history.

(56) References Cited

U.S. PATENT DOCUMENTS

| | | | |
|---|---|---|---|
| 7,243,270 | B2 | 7/2007 | Taniguchi et al. |
| 8,588,767 | B2 | 11/2013 | Fujimoto et al. |

(Continued)

FOREIGN PATENT DOCUMENTS

| | | |
|---|---|---|
| JP | 2000-105522 A | 4/2000 |
| JP | 2000-261453 A | 9/2000 |

(Continued)

*Primary Examiner* — Jerome Grant, II
(74) *Attorney, Agent, or Firm* — Nutter McClennen & Fish LLP; John J. Penny, Jr.; Alex Nagorniy

(57) ABSTRACT

In a system in which a server and a client to which a device is connected communicate, the server can execute processes based on the result of checking device operation. The POS terminal of a network system has a device control function for controlling the device, and a diagnostic function for checking operation of the device. To check the operation of the device connected to the client, a maintenance server sends a control command instructing starting the diagnostic function to the POS terminal. The POS terminal stops the device control function if the device control function is executing, starts the diagnostic function, checks operation of the device with the diagnostic function, and returns the result of the checked operation to the maintenance server.

4 Claims, 12 Drawing Sheets

(51) Int. Cl.
*G06Q 20/20* (2012.01)
*H04L 12/24* (2006.01)

(56) References Cited

U.S. PATENT DOCUMENTS

| | | | | |
|---|---|---|---|---|
| 2004/0181712 A1* | 9/2004 | Taniguchi | ............ | G06F 11/008 714/47.2 |
| 2008/0195752 A1* | 8/2008 | Singla | ................... | H04L 67/025 709/236 |
| 2015/0227284 A1* | 8/2015 | Tehranchi | .......... | G05B 23/0216 715/835 |
| 2016/0044520 A1* | 2/2016 | Iyer | ...................... | H04W 24/08 370/252 |
| 2016/0070812 A1* | 3/2016 | Murphy | ................ | G06F 17/212 707/608 |
| 2016/0366147 A1* | 12/2016 | Nguyen | ............. | H04N 21/4532 |

FOREIGN PATENT DOCUMENTS

| | | | | |
|---|---|---|---|---|
| JP | 2003-162399 A | 6/2003 | | |
| JP | 2004-213618 A | 7/2004 | | |
| JP | 2006-100951 A | 4/2006 | | |
| JP | P2007325238 | * 12/2007 | ............. | B41J 29/38 |
| JP | 2012-216982 A | 11/2012 | | |
| JP | 05-303533 B2 | 10/2013 | | |

* cited by examiner

NETWORK SYSTEM AND CONTROL METHOD OF A NETWORK SYSTEM

This application claims priority under 35 U.S.C. §119 to Japanese Patent Application No. 2015-128781 filed on Jun. 26, 2015, the entire disclosure of which is expressly incorporated by reference herein.

BACKGROUND

1. Technical Field

The present invention relates to a network system and a control method of a network system.

2. Related Art

Network systems (failure prediction systems) having a client and a server in which the client runs a self-diagnostic test (evaluates its own condition) and sends the result to the server are known from the literature. See, for example, JP-A-2004-213618.

Other devices (peripheral devices) may also connect to the client device. As a result, in a system in which a client to which a peripheral device is connected communicates with a server, there is a need to check the operation (status) of peripheral devices connected to the client as controlled by the server so that the server can execute processes based on the result of checking the operation of a particular peripheral device.

SUMMARY

In a system in which a server and a client device to which a device is connected communicate, at least one embodiment of the invention enables checking the operation of the device as controlled by the server, and enables the server to execute an appropriate process based on the result of the operating check.

A network system according to at least one embodiment of the invention includes a client to which a device connects, and a server that communicates with the client. The client performs a device control function to control the device, and a diagnostic function to check operation of the device. The server sends a control command instructing starting of the diagnostic function to the client to check the operation of the device connected to the client. The client, based on the received control command, stops the device control function if the device control function is executing, starts the diagnostic function, checks operation of the device with the diagnostic function, and returns the result of the checked operation to the server.

Thus comprised, in a system in which a server and a client device to which a device is connected communicate, the server controls checking the operation of the device, and the server can execute an appropriate process based on the result of the operating check.

In a network system according to another aspect of at least one embodiment of the invention, the server sends a control command instructing starting of the diagnostic function and specifying one or more processes to implement the device control function to the client to check the operation of the device connected to the client; and if the device control function is executing, the client stops the device control function by stopping the one or more specified processes based on the received control command.

Thus comprised, the server can check the operation of a device after cancelling control of that device by the device control function.

In a network system according to another aspect at least one embodiment of the invention, a print unit (print mechanism) having a print function is connected to the client as the device; and the operation of the print unit checked by the diagnostic function of the client is an operation related to printing.

Thus comprised, in a system in which a server and a client device to which a print unit is connected as a device communicate, the server controls checking the operation of the print unit, and the server can execute an appropriate process based on the result of the checked operation.

In a network system according to another aspect of at least one embodiment of the invention, the operation check of the device executed by the diagnostic function of the client is executed in steps; and the client sends the result of the checked operation to the server each time a step in the operation check of the device is completed.

Thus comprised, device operation is checked in steps, the server gets the result of each operation when each step ends, and can execute an appropriate process.

In a network system according to another aspect of at least one embodiment of the invention, the client restarts after the operation check of the device is completed.

Thus comprised, functions can be started by the client in the initialized state as a result of the initialization process executed when the client reboots after checking device operation is completed.

Another aspect of at least one embodiment of the invention is a control method of a network system including a client to which a device connects, and a server that communicates with the client, wherein: the client has a device control function to control the device, and a diagnostic function to check operation of the device. In the method, the server sends a control command instructing starting of the diagnostic function to the client to check the operation of the device connected to the client; and the client, based on the received control command, stops the device control function if the device control function is executing, starts the diagnostic function, checks operation of the device with the diagnostic function, and returns the result of the checked operation to the server.

Thus comprised, in a system in which a server and a client device to which a device is connected communicate, the server controls checking the operation of the device, and the server can execute an appropriate process based on the result of the operating check.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
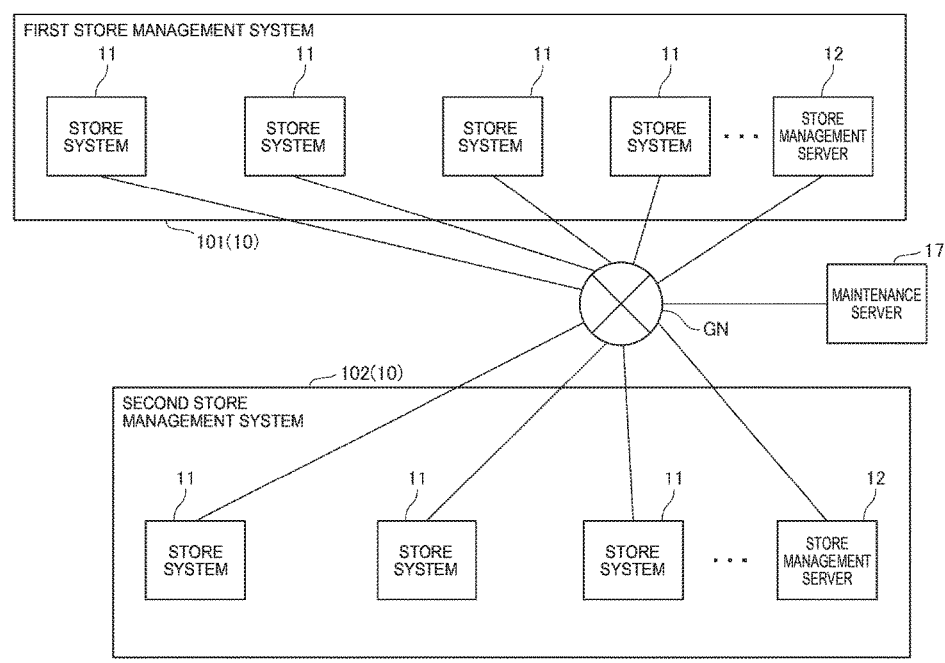
FIG. 1 illustrates the configuration of a network system according to the invention.

FIG. 1 illustrates the configuration of a network system 1 according to this embodiment of the invention.

As shown in FIG. 1, the network system 1 includes multiple store management systems 10 (two, first store management system 101 and second store management system 102, shown in FIG. 1).

The store management system 10 is a system used by a corporation that operates such businesses as supermarkets, convenience stores, department stores, and restaurants. In FIG. 1, the first store management system 101 is a system used by company K1, and the second store management system 102 is a system used by company K2. company K1 and company K2 are completely independent companies with no business ties therebetween, and the first store management system 101 and the second store management system 102 do not exchange information.

In this embodiment of the invention, a store is an operation that sells merchandise. However, a store as used herein is not limited to selling merchandise, and may sell food and drink or a specific service, and includes any operation where sales transactions are made. The main entity using a store management system 10 according to this embodiment of the invention is also a corporation. The store management system 10 is not limited to use by corporations, however.

The store management system 10 includes one or more store systems 11 and a store management server 12. The store systems 11 and the store management server 12 are connected and communicate through a global network GN such as the Internet.

Figure 2:
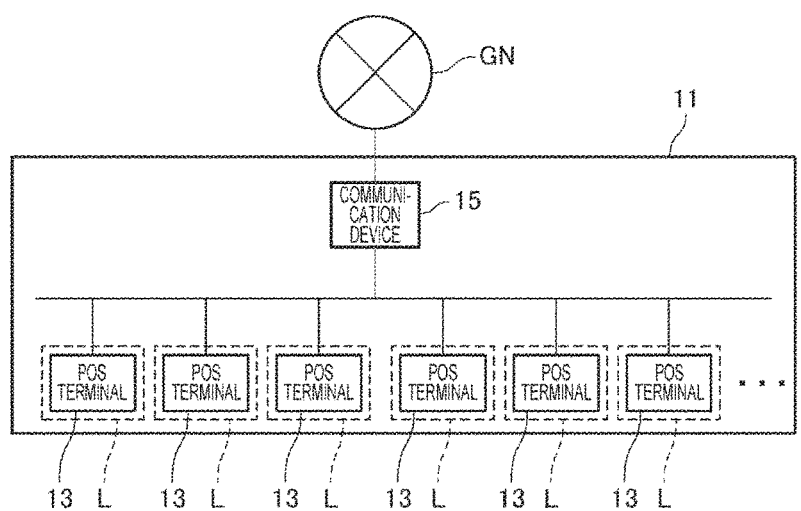
FIG. 2 illustrates the configuration of a store system.

FIG. 2 illustrates the configuration of a store system 11.

A store system 11 is a system installed in an individual store, and has a function for processing transactions and a function for producing transaction receipts as described further below.

A checkout counter L where customer transactions are processed is located in the business where the store system 11 is deployed. A POS terminal 13 (client) that can produce receipts appropriate to the transaction is installed at each checkout counter L. The receipt produced by the POS terminal 13 is then given to the customer by the checkout clerk.

The configuration and functions of the POS terminal 13, and processes based on the functions of the POS terminal 13, are described further below.

The store system 11 also has a local area network LAN.

The POS terminal 13 connects to the local area network LN according to a communication protocol appropriate to the LAN. Any suitable communication protocol may be used by the POS terminal 13 to connect to the local area network LAN, and a wired or wireless connection may be used.

A communication device 15 is also connected to the local area network LAN. The communication device 15 is an interface device that connects the local area network LAN to a global network GN (network). The communication device 15 has the functions of a modem (or ONU (Optical Network Unit)), a router, a DHCP (Dynamic Host Configuration Protocol) server, and a NAT (Network Address Translation) unit. The communication device 15 passes data between devices when a device connected to the local area network LN and a device connected to the global network GN communicate with each other. Note that the communication device 15 is represented by a single function block in FIG. 1, but the communication device 15 may comprise plural devices with different functions.

The POS terminals 13 communicate with each other through the local area network LAN.

The POS terminal 13 can also access the global network GN through the communication device 15 on the local area network LAN, and access devices connected to the global network GN.

The store management server 12 is a cloud server in a cloud system in which the POS terminal 13 is a client.

The configuration and functions of the store management server 12, and processes based on the functions of the store management server 12, are described further below.

As shown in FIG. 1, a maintenance server 17 (server) is connected to the global network GN. The maintenance server 17 is a cloud server in a cloud system in which the POS terminal 13 and other devices are clients.

The configuration and functions of the maintenance server 17, and processes based on the functions of the maintenance server 17, are described further below.

Note that the store management server 12 and maintenance server 17 are represented by single function blocks in FIG. 1, but this does not mean the store management server 12 and maintenance server 17 are embodied by single server devices. For example, the store management server 12 or maintenance server 17 may be embodied by a plurality of server devices, or by functions of a distributed computing system or host system.

Figure 3:
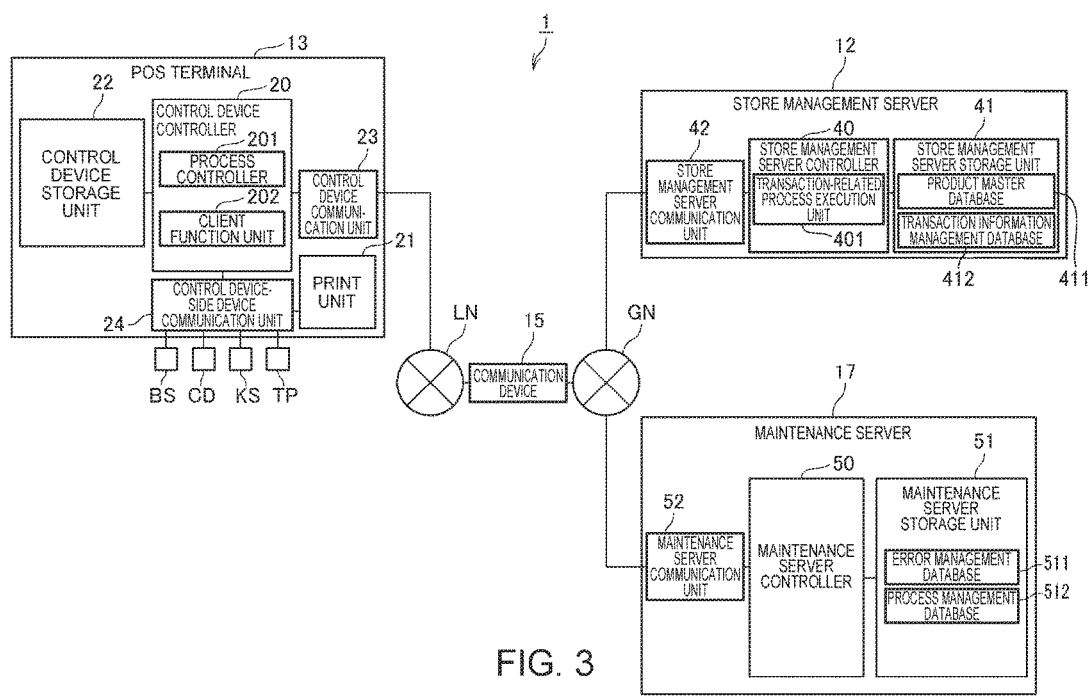
FIG. 3 is a block diagram illustrating the functional configuration of devices in the network system.

FIG. 3 is a block diagram showing the functional configuration of a POS terminal 13, store management server 12, and maintenance server 17 in the network system 1.

The POS terminal 13 can be a thermal line printer that stores roll paper (recording medium) and records images by forming dots with a thermal line head on the roll paper.

As shown in FIG. 3, the POS terminal 13 has a control device controller 20, a print unit 21 (device), a control device storage unit 22, a control device communication unit 23, and a control device-side device communication unit 24.

The control device controller 20 has a CPU, ROM, RAM, and other peripheral circuits not shown, and controls the POS terminal 13.

The control device controller 20 includes a process controller 201 and a client function unit 202.

The process controller 201 is a function block embodied by executing a process based on firmware installed on the POS terminal 13 and associated programs.

The client function unit 202 is also a function block embodied by executing a process based on firmware installed on the POS terminal 13 and associated programs.

The control device storage unit 22 has nonvolatile memory and stores data.

The control device communication unit 23 accesses the local area network LAN and communicates with other devices connected to the local area network LAN as controlled by the control device controller 20.

The control device communication unit 23 also accesses the global network GN through the communication device 15 on the local area network LAN, and communicates with other devices connected to the global network GN, as controlled by the control device controller 20.

The control device-side device communication unit 24 has an interface board with a USB port, a port conforming to a non-USB serial communication standard, or ports conforming to other communication protocols. The control device-side device communication unit 24 communicates with devices connected to the appropriate ports as controlled by the control device controller 20. Note that the control device-side device communication unit 24 may also be configured with a wireless communication capability and communicate with devices wirelessly.

In the example shown in FIG. 3, a barcode scanner BS, customer display CD, cash drawer KS, and touch panel TP are examples of devices that connect to the POS terminal 13.

The print unit 21 is connected to the control device controller 20 of the POS terminal 13 as a peripheral device.

The barcode scanner BS is used to read barcodes from products and product packaging, and outputs data representing the barcode to the control device-side device communication unit 24. The control device-side device communication unit 24 then outputs the data input from the barcode scanner BS to the control device controller 20.

The customer display CD displays images as controlled by the control device controller 20. The information presented on the customer display CD can be read by the customer involved in the transaction at the checkout counter L.

The cash drawer KS has a tray for storing cash, and a mechanism for locking the tray, and unlocks and opens the tray as controlled by the control device controller 20.

The touch panel TP has a display device such as an LCD panel or OLED panel, and a touch sensor disposed over the display device for detecting touch operations by the user (including the checkout clerk). The touch panel TP is disposed at a position at the checkout counter L where it can be read by the checkout clerk and operated by touch. The touch panel TP displays images on the display device as controlled by the control device controller 20. The client function unit 202 of the control device controller 20 can display a web page on the touch panel TP based on an HTML file acquired by a specific means. When a touch operation by the user is detected, the touch panel TP outputs a signal indicating the touched position to the control device controller 20.

Based on input from the touch panel TP, the control device controller 20 executes a process corresponding to the touch operation of the user.

The print unit 21 is a printing device that can comprise a conveyance mechanism for conveying roll paper stored inside the cabinet of the POS terminal 13, a print mechanism for forming dots and recording images on the roll paper with a thermal head, and a cutter mechanism for cutting the roll paper at a specific position.

The print unit 21 can convey the roll paper with the conveyance mechanism, can record receipt-related images on the roll paper with the print mechanism, and can cut the roll paper at a specific position with the cutter mechanism as controlled by the control device controller 20 to produce a receipt.

In this embodiment of the invention, the print unit 21 is housed inside the cabinet of the POS terminal 13. However, the print unit 21 may be located outside the cabinet of the POS terminal 13 and connected to the control device controller 20 of the POS terminal 13 as a device separate from the POS terminal 13.

As shown in FIG. 3, the store management server 12 has a store management server controller 40, a store management server storage unit 41, and a store management server communication unit 42.

The store management server controller 40 includes a CPU, ROM, RAM, and other peripheral circuits, and controls the store management server 12.

The store management server controller 40 includes a transaction-related process execution unit 401.

The transaction-related process execution unit 401 is a function block embodied by executing processes based on running a specific web application run by server software installed on the store management server 12 and associated programs.

The store management server storage unit 41 comprises nonvolatile memory such as a hard disk drive or EEPROM device, and stores data.

The store management server storage unit 41 also stores a product master database 411. The product master database 411 stores a product code, price, and other product-related information for products sold in the business.

The store management server storage unit 41 stores a transaction information management database 412. The transaction information management database 412 is described further below.

As shown in FIG. 3, the maintenance server 17 has a maintenance server controller 50, a maintenance server storage unit 51, and a maintenance server communication unit 52.

The maintenance server controller 50 includes a CPU, ROM, RAM, and other peripheral circuits, and controls the maintenance server 17.

The maintenance server storage unit 51 has nonvolatile memory such as a hard disk drive or EEPROM device not shown, and stores data.

The maintenance server storage unit 51 stores an error management database 511 and a process management database 512. These databases are described further below.

The maintenance server communication unit 52 accesses the global network GN and communicates with devices connected to the network (including the POS terminal 13) as controlled by the maintenance server controller 50.

The operation of a POS terminal 13 installed in the store when the POS terminal 13 is turned on is described next.

Figure 4:
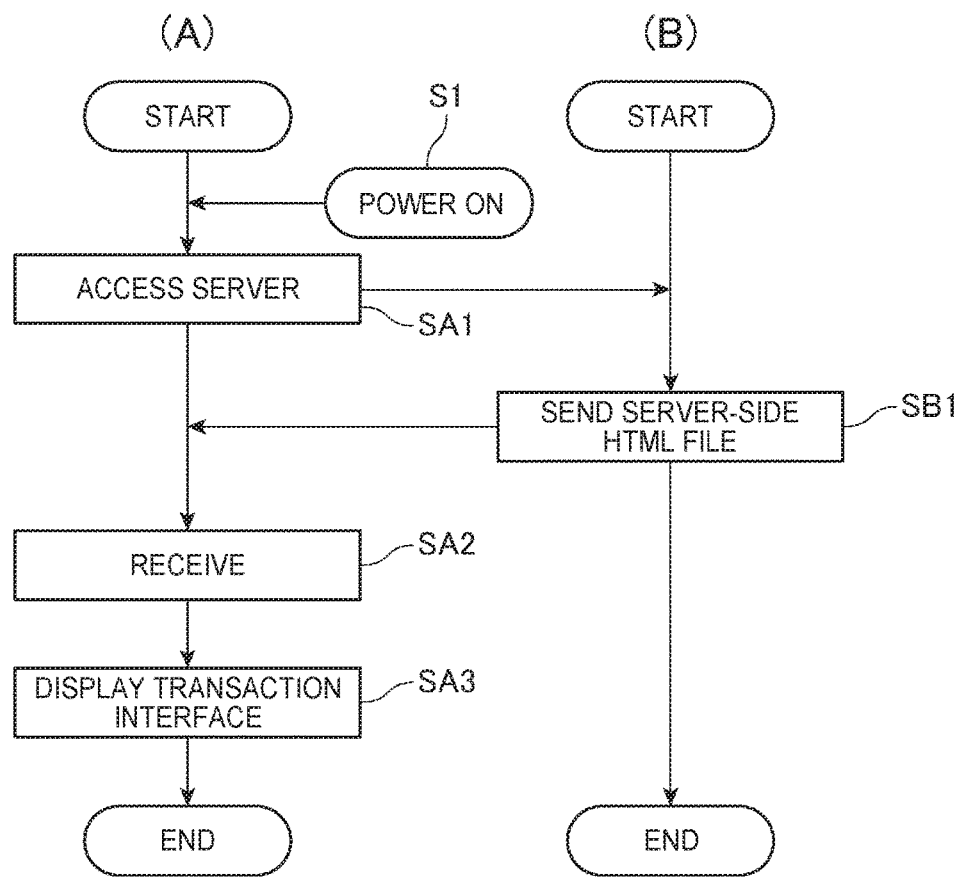
FIG. 4 is a flow chart showing an operation of the POS terminal and store management server.

FIG. 4 is a flow chart showing the operation of the POS terminal 13 and store management server 12 when the POS terminal 13 is turned on. Column (A) of FIG. 4 shows the operation of the POS terminal 13, and column (B) shows the operation of the store management server 12.

The checkout clerk first turns the POS terminal 13 on (step S1). In this example, the POS terminal 13 is installed at a checkout counter L, and the checkout clerk turns the POS terminal 13 on before the store opens each day. In this example, the POS terminal 13 is configured to automatically start a specific web browser when the POS terminal 13 turns on.

As shown in column (A) of FIG. 4, when the browser starts, the client function unit 202 of the POS terminal 13 accesses a specific URL on the store management server 12 (step SA1). The URL of the store management server 12, the format of data exchanged in communication with the store management server 12, and other information required to communicate with the store management server 12 is previously registered in the POS terminal 13.

As shown in column (B) of FIG. 4, when the specific URL is accessed by the POS terminal 13, the transaction-related process execution unit 401 of the store management server 12 controls the store management server communication unit 42 to send a specific HTML file to the POS terminal 13 (step SB1). The specific HTML file is an HTML file having at least a function for displaying the user interface for processing transactions 60 described below.

As shown in column (A) of FIG. 4, the client function unit 202 of the POS terminal 13 controls the control device communication unit 23 to receive and acquire the specific HTML file (step SA2).

Figure 5:
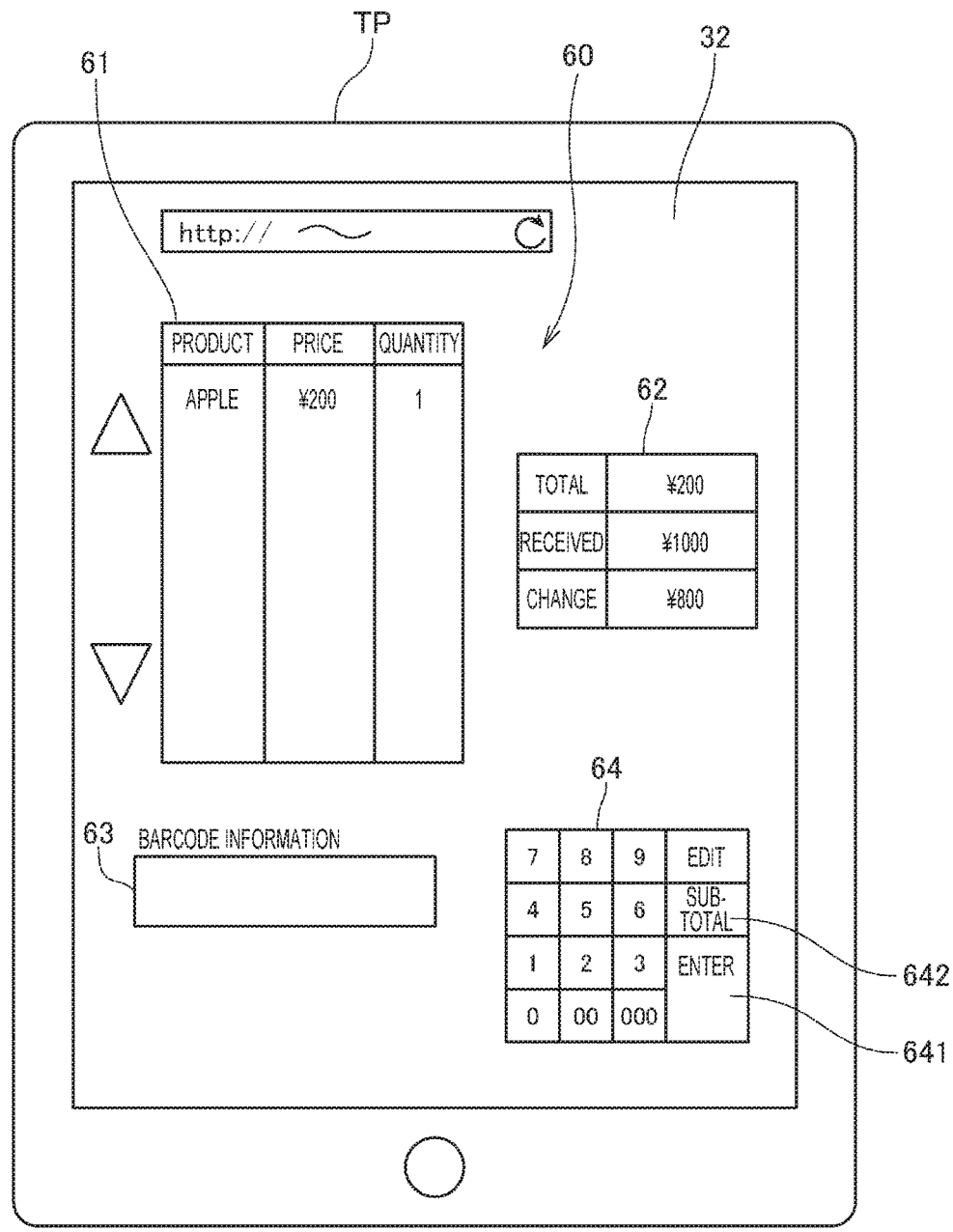
FIG. 5 shows an example of a user interface for processing transactions.

The client function unit 202 executes the acquired specific HTML file, and displays a user interface for processing transactions 60 (for example, as shown in FIG. 5) on the touch panel TP (step SA3).

A list display area 61, where the names of the products being purchased by the customer, the prices of the products, and the quantities of the products are presented in a list, is displayed at the top left of the user interface for processing transactions 60 in FIG. 5. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is basically the product code assigned to the product.

A virtual keypad 64 is displayed on the right side of the barcode information display area 63. The virtual keypad 64 includes an Enter key 641 for finalizing the transaction, and a Subtotal key 642 for calculating the subtotal (the total of the products purchased by the customer).

The checkout clerk then processes the transaction using the user interface for processing transactions 60 at the checkout counter L.

As described above, a user interface for processing transactions 60 used to process a transaction (business) at the checkout counter L is automatically displayed on the touch panel TP of the POS terminal 13 when the POS terminal 13 turns on. As a result, there is no need for the operator to input the URL of the store management server 12, for example, when the POS terminal 13 turns on, and the productivity of the operator and user convenience are improved.

The transaction process executed by the POS terminal 13 during a transaction at the checkout counter L is described next.

Figure 6:
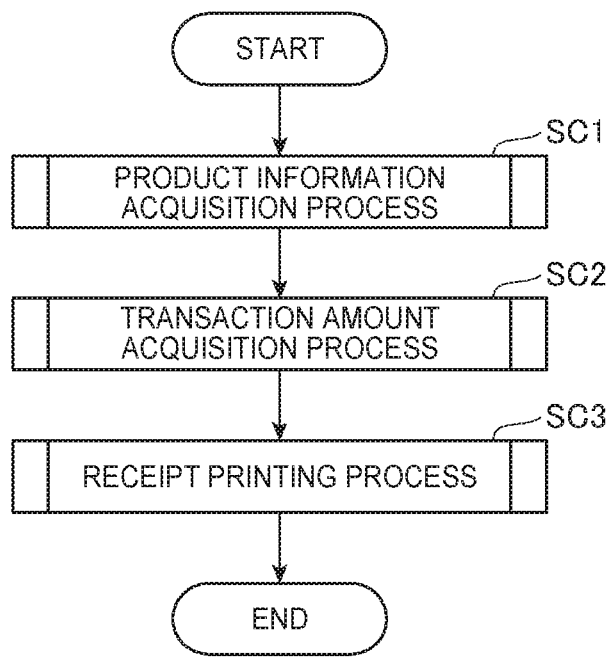
FIG. 6 is a flow chart showing an operation of the POS terminal.

FIG. 6 is a flow chart of the operation of the POS terminal 13 when executing the transaction process.

As shown in FIG. 6, during the transaction process, the client function unit 202 of the control device controller 20 of the POS terminal 13 first executes a product information acquisition process (step SC1).

In the product information acquisition process, the client function unit 202 communicates with the store management server 12 to acquire the name and price of each item the customer purchases (referred to below as product-related information), and executes processes based on the acquired product-related information. This product information acquisition process is described further below.

Figure 7:
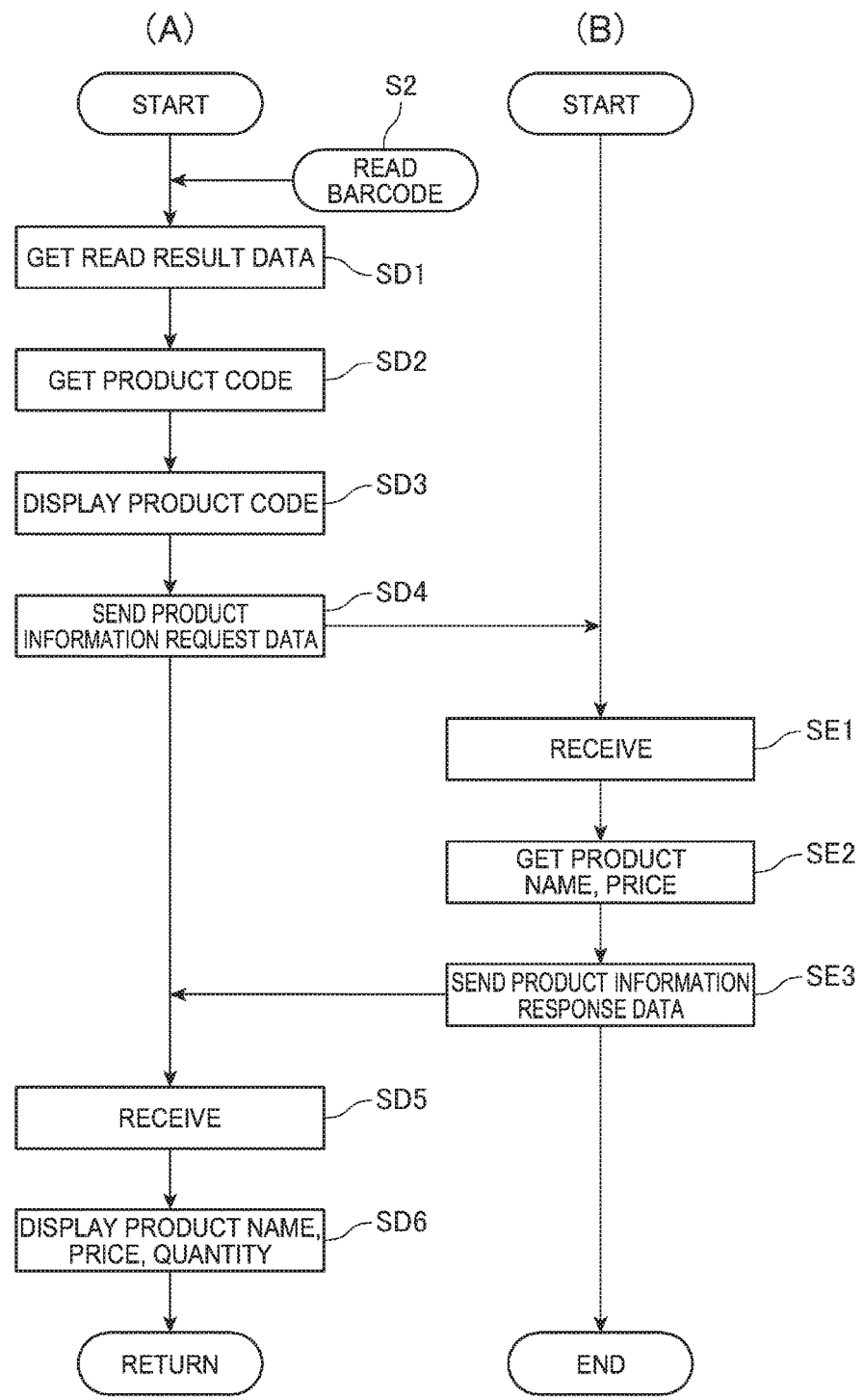
FIG. 7 is a flow chart showing an operation of the POS terminal and store management server.

FIG. 7 is a flow chart of the operation of the POS terminal 13 and the store management server 12 when executing the product information acquisition process. Column (A) FIG. 7 shows the operation of the POS terminal 13, and column (B) FIG. 7 shows the operation of the store management server 12.

In the transaction process at the checkout counter L, the checkout clerk reads the barcode on the product or the packaging of the product being purchased by the customer with the barcode scanner BS (step S2). Upon reading a barcode, the barcode scanner BS sends data based on the read result (referred to below as the "read result data") through the port to which the barcode scanner BS is connected to the control device-side device communication unit 24 of the POS terminal 13. The control device-side device communication unit 24 then outputs the read result data to the control device controller 20.

The read result data is data including information indicating the product code of the product.

As shown in column (A) FIG. 7, the client function unit 202 of the control device controller 20 of the POS terminal 13 then acquires the read result data based on the input from the control device-side device communication unit 24 (step SD1).

Next, the client function unit 202 acquires the product code based on the read result data (step SD2).

Next, the client function unit 202 displays the product code acquired in step SD2 in the barcode information display area 63 of the user interface for processing transactions 60 (step SD3).

Next, the client function unit 202 controls the control device communication unit 23 to send the product name for the product code acquired in step SD2 and data querying the price of the product (referred to below as product information request data) to the store management server 12 (step SD4).

As shown in column (B) FIG. 7, the transaction-related process execution unit 401 of the store management server controller 40 of the store management server 12 controls the store management server communication unit 42 to receive the product information request data (step SE1).

Next, the transaction-related process execution unit 401, based on the received product information request data, acquires the product code, references the product master database 411 stored by the store management server storage unit 41, and acquires the name and price of the produce identified by the acquired product code (step SE2).

The process of step SE2 is equivalent to a request by the store management server 12 (server).

Next, the transaction-related process execution unit 401 controls the store management server communication unit 42 to send product information response data expressing the product name and price information acquired in step SE2 to the POS terminal 13 (step SE3).

The product information response data corresponds to a response, and the process of step SE3 is equivalent to a process of sending a response indicating the result of a process corresponding to the request.

As shown in column (A) FIG. 7, the client function unit 202 of the control device controller 20 of the POS terminal 13 then controls the control device communication unit 23 to receive the product information response data (step SD5).

Next, the client function unit 202 acquires the product name and product price information based on the received product information response data, and displays the name, price, and quantity of the product in the corresponding fields of the list display area 61 in the user interface for processing transactions 60 (step SD6).

In the product information acquisition process, the checkout clerk reads the barcode with the barcode scanner BS from each product being purchased by the customer, and the POS terminal 13 and store management server 12 execute the process shown in the flow chart in FIG. 7 based on the read barcode.

When reading the barcode from every product and processing by each device based on the read barcode is completed, the product information acquisition process shown in step SC1 in FIG. 6 ends.

When the barcode of every product has been read and processing by each device based on the read barcode is completed, the name, price, and quantity of each product the customer purchases is displayed in the list display area 61.

As shown in FIG. 6, after completing the product information acquisition process in step SC1, the client function unit 202 executes a transaction amount acquisition process (step SC2). In the transaction amount acquisition process of step SC2, the client function unit 202 acquires the total amount of the products purchased by the customer, and acquires the amount of change due based on the amount received from the customer. This transaction amount acquisition process is described further below.

Figure 8:
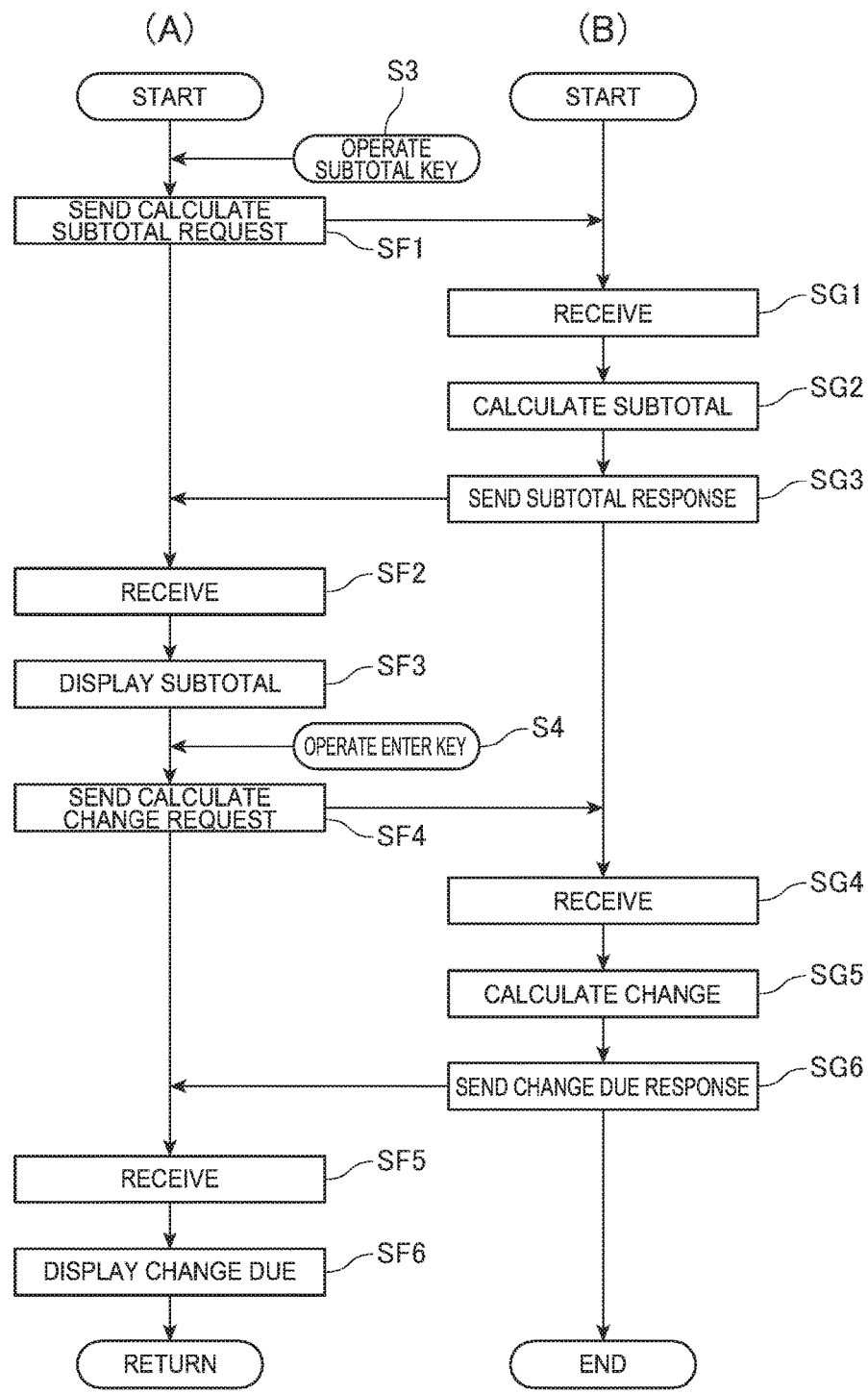
FIG. 8 is a flow chart showing an operation of the POS terminal and store management server.

FIG. 8 is a flow chart showing the operation of the POS terminal 13 and the operation of the store management server 12 in the transaction amount acquisition process. Column (A) FIG. 8 shows the operation of the POS terminal 13, and column (B) FIG. 8 shows the operation of the store management server 12.

When reading the barcode from every product is completed, the checkout clerk operates the Subtotal key 642 of the virtual keypad 64 (step S3).

As shown in column (A) FIG. 8, when operation of the Subtotal key 642 is detected, the client function unit 202 of the control device controller 20 of the POS terminal 13 generates a subtotal calculation request requesting calculating the subtotal, and controls the control device communication unit 23 to send the request to the store management server 12 (step SF1). When the subtotal calculation request is sent, the client function unit 202 starts counting how much time passes.

As shown in column (B) FIG. 8, the transaction-related process execution unit 401 of the store management server 12 controls the store management server communication unit 42 to receive the subtotal calculation request (step SG1).

Next, the transaction-related process execution unit 401 calculates the subtotal based on the received subtotal calculation request (step SG2). Note that the transaction-related process execution unit 401 manages the product barcodes of the products purchased by the customer based on the product information response request and associated data received from the POS terminal 13. In step SG2, the transaction-related process execution unit 401 references the product master database 411 based on the managed product barcodes, and calculates the subtotal (the total of the purchased products). The method of calculating the subtotal is not limited to this example, and any appropriate method may be used.

Next, the transaction-related process execution unit 401 sends a subtotal response denoting the calculated subtotal to the POS terminal 13 (step SG3).

As shown in column (A) FIG. 8, the client function unit 202 of the control device controller 20 of the POS terminal 13 controls the control device communication unit 23 to receive the subtotal response (step SF2).

Next, the client function unit 202, based on the received subtotal response, displays the subtotal (the total of the purchased products) in the appropriate field of the amount display area 62 (step SF3).

When the subtotal is displayed in the amount display area 62, the customer pays the checkout clerk. The checkout clerk receives payment from the customer, inputs the amount received through the virtual keypad 64, and operates the Enter key 641 (step S4). When operation of the Enter key 641 is detected, the client function unit 202 displays the amount received from the customer in the corresponding field of the amount display area 62.

When operation of the Enter key 641 is detected, the client function unit 202 also sends a calculate change request requesting calculating the amount of change due to the store management server 12 (step SF4). When the calculate change request is sent, the client function unit 202 starts counting how much time passes.

As shown in column (B) FIG. 8, the transaction-related process execution unit 401 of the store management server 12 controls the store management server communication unit 42 to receive the calculate change request (step SG4).

Next, the transaction-related process execution unit 401 calculates the amount of change due (step SG5).

Next, the transaction-related process execution unit 401 sends a change-due response indicating the calculated change that is due to the POS terminal 13 (step SG6).

As shown in column (A) FIG. 8, the client function unit 202 of the POS terminal 13 controls the control device communication unit 23 to receive the change-due response (step SF5).

Next, the client function unit 202, based on the received change-due response, displays the amount of change in the appropriate field of the amount display area 62 (step SF6).

Based on the change amount displayed in the amount display area 62, the checkout clerk returns change to the customer.

As described above, in the transaction amount acquisition process of step SC2, the client function unit 202 acquires the total of the purchased products, and then calculates the amount of change due to the customer based on the amount received from the customer.

As shown in FIG. 6, after the transaction amount acquisition process, the client function unit 202 produces a receipt (step SC3). In the receipt printing process of step SC3, the client function unit 202 communicates with the store management server 12 to produce a receipt printed with information including information related to the products purchased by the customer, and the total of the purchased products. The receipt printing process is described below.

Figure 9:
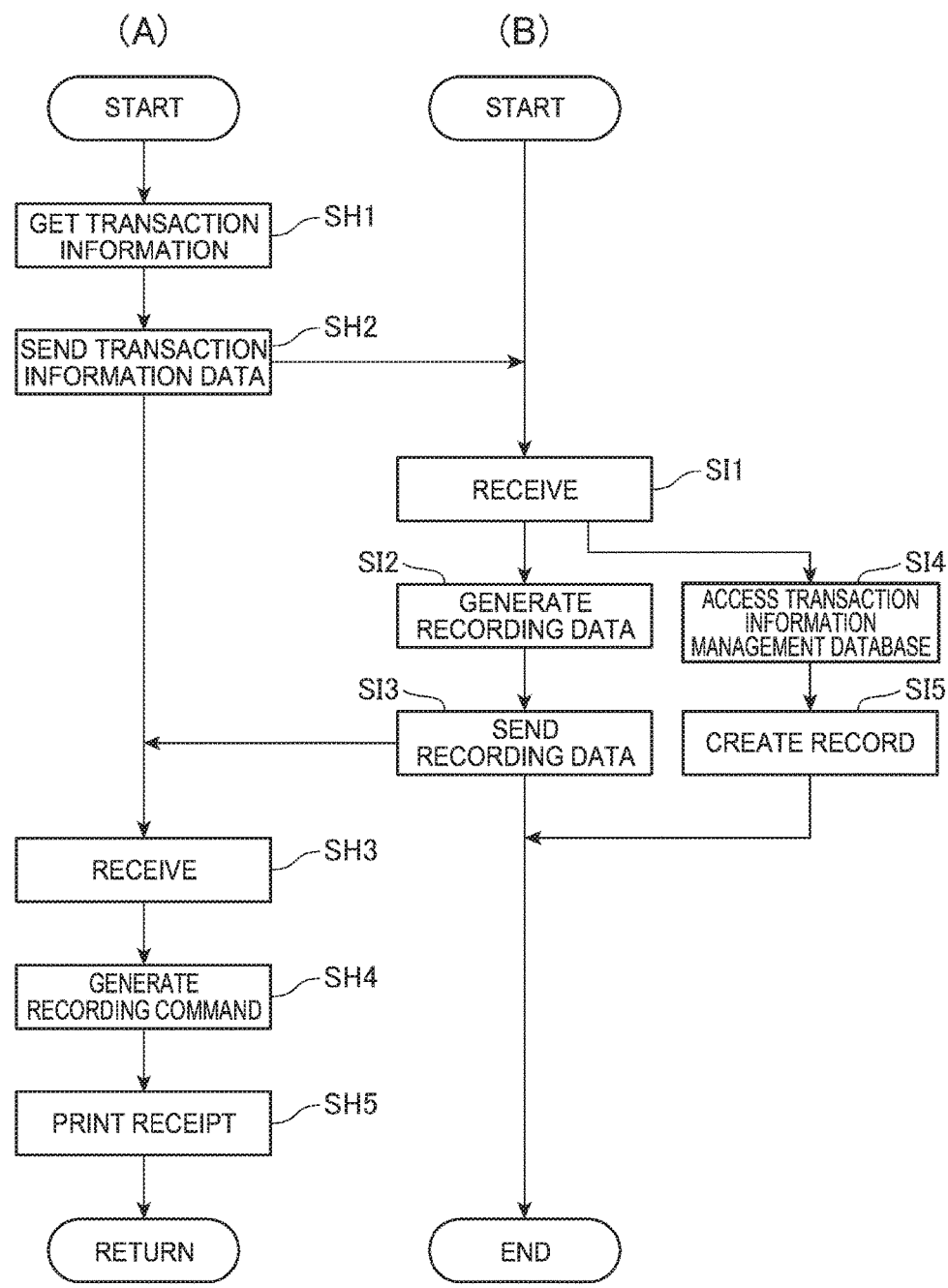
FIG. 9 is a flow chart showing an operation of the POS terminal and store management server.

FIG. 9 is a flow chart showing the operation of the POS terminal 13 and the store management server 12 when executing the receipt printing process. Column (A) of FIG. 9 shows the operation of the POS terminal 13, and column (B) of FIG. 9 shows the operation of the store management server 12.

As shown in FIG. 9 (A), when the transaction amount acquisition process ends, the client function unit 202 of the control device controller 20 of the POS terminal 13 acquires the transaction information (step SH1).

The transaction information is information including: identification information uniquely assigned to each transaction (referred to below as transaction identification information); information denoting the combination of product code, name, price, and quantity for each product purchased by the customer (referred to below as the purchased product information); information denoting the subtotal, the cash amount received from the customer, and the change returned to the customer (referred to below as transaction amount information); information denoting the time of the transaction (referred to below as the transaction time information);

and the store ID, which is identification information for the store (business) where the transaction was completed.

Note that during a transaction, the client function unit 202 stores information contained the purchased product information and information contained in the transaction amount information to specific storage areas. In step SH1, the client function unit 202 acquires purchased product information and transaction amount information based on the information stored to the specific storage areas.

The time the transaction was performed as indicated by the transaction time information is the time when the Enter key 641 was operated. The time when the transaction was performed as indicated by the transaction time information is not limited to the time when the Enter key 641 was operated, and may be any time derived from the transaction, such as the time when the barcode for the first product was read in the transaction.

The client function unit 202 also performs a function for generating transaction identification information for each transaction, and generates the transaction identification information using this function. The value of the transaction identification information is unique to each transaction performed in each store.

After acquiring the transaction information, the client function unit 202 controls the control device communication unit 23 to send transaction information data expressing the acquired transaction information data to the store management server 12 (step SH2).

As shown in column (B) of FIG. 9, the transaction-related process execution unit 401 of the store management server controller 40 of the store management server 12 controls the store management server communication unit 42 to receive the transaction information data (step SI1).

Next, the transaction-related process execution unit 401 generates recording data for producing a receipt in a specific layout based on the transaction information indicated by the received transaction information data (step SI2).

The recording data is control data specifying producing a receipt according to a specific layout, and including in this example a top logo, bottom logo, transaction identification information, the time of the transaction, the name, price, quantity and total amount of the products purchased by the customer, the amount received from the customer, and the amount of change due to the customer. The recording data in this embodiment is an XML document of information written in a specific XML format.

Next, the transaction-related process execution unit 401 controls the store management server communication unit 42 to send the generated recording data to the POS terminal 13 (step S13).

After receiving the transaction information data in step SI1, the transaction-related process execution unit 401 accesses the transaction information management database 412 stored by the store management server storage unit 41 (step SI4).

Each record in the transaction information management database 412 relationally stores the transaction identification information, purchased product information, transaction amount information, transaction time information, and store ID.

Next, based on the transaction information data received in step SI2, a record relating the transaction identification information, purchased product information, transaction amount information, transaction time information, and store ID is created in the transaction information management database 412 (step SI5).

The store management server 12 thus cumulatively stores transaction information appropriate to each transaction. As a result, information such as sales by store and sales by individual product in each store can be managed.

As shown in column (A) of FIG. 9, the client function unit 202 of the control device controller 20 of the POS terminal 13 controls the control device communication unit 23 to receive the recording data (step SH3).

Next, the client function unit 202 generates recording commands in the command language of the process controller 201 based on the recording data of an XML document (step SH4). The client function unit 202 outputs the generated recording commands to the process controller 201.

Next, the process controller 201 controls the print unit 21 based on the generated recording commands to produce a receipt (step SH5).

The checkout clerk then gives the receipt produced in step SH5 to the customer.

As described above, the POS terminal 13 in this embodiment of the invention executes a transaction process and produces a receipt based on a transaction using functions of the store management server 12. The store management server 12 also cumulatively stores the transaction information derived from the transaction process.

The maintenance server 17 is described next.

The maintenance server 17 performs a function for managing the status of the POS terminals 13 in the store systems 11 of the store management system 10 irrespective of the companies using the store management system 10. The maintenance server 17 also performs a function for providing useful information about the status of the POS terminals 13 to store management system 10 operators, such as maintenance technicians responsible for maintaining the POS terminals 13 of the store systems 11.

The operation of the maintenance server 17 when managing the status of the POS terminals 13 is described below.

Figure 10:
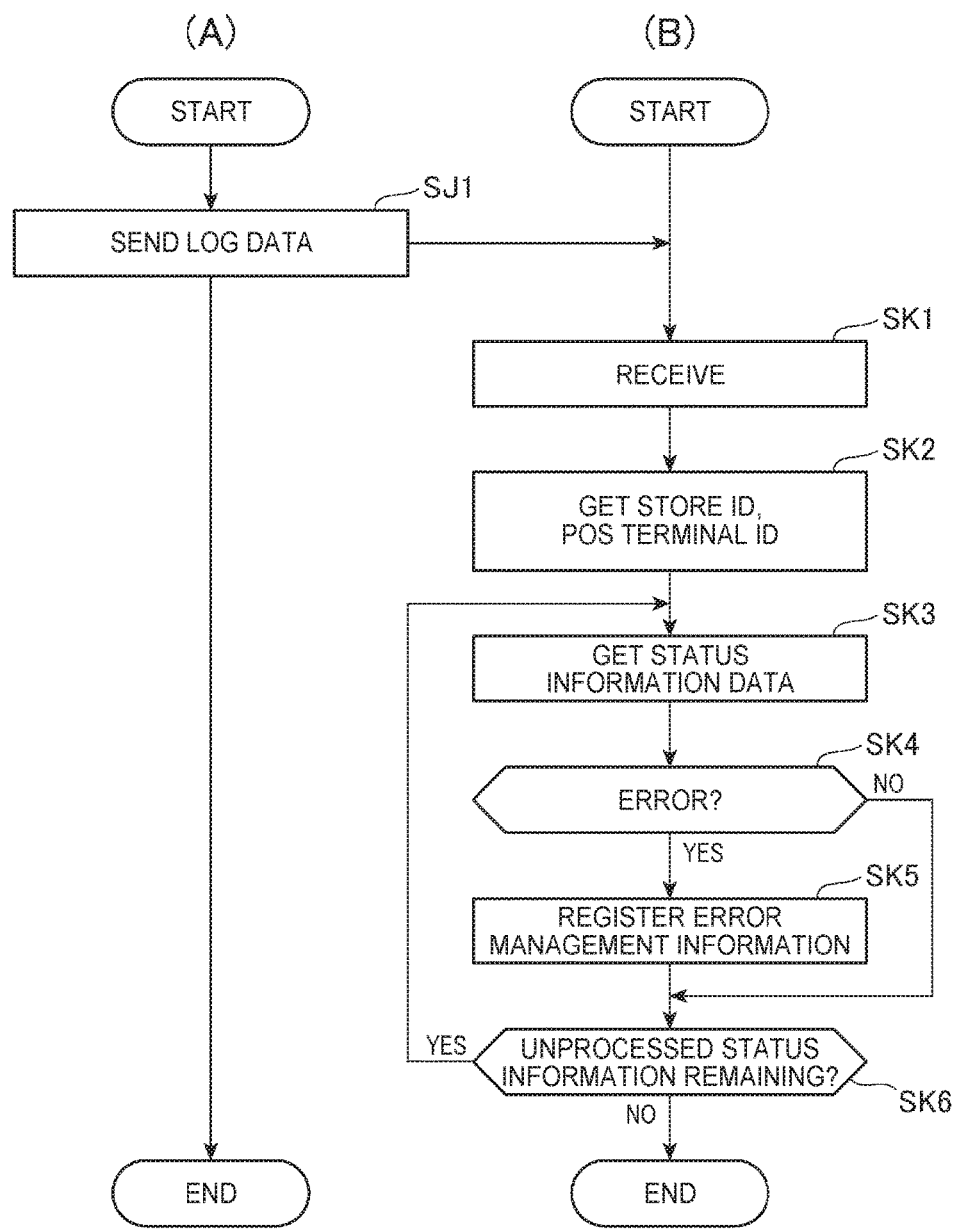
FIG. 10 is a flow chart showing an operation of the POS terminal and maintenance server.

FIG. 10 is a flow chart of the operation of the POS terminal 13 and maintenance server 17 when the maintenance server 17 manages the status of a POS terminal 13. Column (A) of FIG. 10 shows the operation of the POS terminal 13, and column (B) shows the operation of the maintenance server 17.

As shown in column (A) of FIG. 10, the client function unit 202 of the POS terminal 13 controls the control device communication unit 23 to generate and send log data to the maintenance server 17 (step SJ1).

The log data is data including status information representing the state of items to monitor and log.

A log item is a particular condition of the POS terminal 13 to monitor and record information about in a log. In this embodiment of the invention, the log items are RAM Usage, CPU Usage, and data transfer rate.

RAM Usage is a log item related to the usage of RAM (referred to below as RAM Usage). CPU Usage is a log item related to CPU use (referred to below as CPU Usage). Data Transfer Rate is a log item related to the data transfer rate. The data transfer rate is the amount of data that can be transmitted per unit time through the global network GN.

The process controller 201 performs a function for keeping and recording a log of each item in a log file not shown.

More specifically, for the log item RAM Usage, the process controller 201 acquires RAM usage at a specific interval, and records information denoting the acquired RAM usage relationally to information denoting the time of acquisition (date+time) in the log file. As a result, RAM usage is recorded chronologically in a log file of information indicating RAM usage and information indicating the time and date.

For the log item CPU Usage, the process controller 201 acquires CPU usage at a specific interval, and records information denoting the acquired CPU usage relationally to information denoting the acquisition time (date+time) in the log file. As a result, CPU usage is recorded chronologically in the log file of CPU usage information and information denoting the time and date.

For the log item Data Transfer Rate, the process controller 201 acquires the data transfer rate at a specific interval, and records information denoting the acquired data transfer rate relationally to information denoting the acquisition time (date+time) in the log file. As a result, the data transfer rate is recorded chronologically in the log file of data transfer rate information and information denoting the time and date.

Note that the log items described above are for example only. For example, other possible log items can include log items related to communication errors (states in which normal communication is not possible); log items related to printer errors (states in which normal printing is not possible); log items related to memory status; log items related to the print mechanism, cutter mechanism, conveyance mechanism, and other mechanical assemblies; log items related to operating processes to which CPU time is allocated; and log items related to devices connected to the POS terminal 13.

In step SJ1 in column (A) of FIG. 10, the client function unit 202 references the log file. Next, the client function unit 202 acquires the information for the RAM usage log item from the log file. Next, based on the acquired information, the client function unit 202 generates RAM usage status information including information denoting the RAM usage and information denoting the date and time the RAM usage was acquired. Next, the client function unit 202 generates status information data containing RAM usage identification information identifying the RAM usage log item, and the generated RAM usage state information (below, the status information data related to the RAM usage log item is referred to as "RAM usage status information data").

Likewise for the CPU usage log item, the client function unit 202 generates CPU usage state information including information denoting the CPU usage and information denoting the date and time the CPU usage was acquired. Next, the client function unit 202 generates status information data containing CPU usage identification information identifying the CPU usage log item, and the generated CPU usage state information (below, the status information data related to the log item: CPU Usage is referred to as "CPU usage status information data").

For the data transfer rate log item, the client function unit 202 generates status information data including data transfer rate identification information identifying the data transfer rate log item, data transfer rate status information denoting the data transfer rate, and information denoting when the data transfer rate was acquired (below, the status information data related to the data transfer rate log item is referred to as the data transfer rate status information data.

Next, the client function unit 202 generates log data including a store ID identifying the store where the POS terminal 13 is located, a POS terminal ID identifying the particular POS terminal 13, and the status information data generated for each log item.

The POS terminal ID may be, for example, the serial number assigned to the POS terminal 13 at the factory.

Next, the client function unit 202 sends the generated log file to the maintenance server 17.

Note that the client function unit 202 executes the process of step SJ1 at a regular interval. For example, the client function unit 202 may execute the process of step SJ1 every five minutes. As a result, log data is sent regularly at a specific interval from the POS terminal 13 to the maintenance server 17.

As shown in column (B) of FIG. 10, the maintenance server controller 50 of the maintenance server 17 controls the maintenance server communication unit 52 to receive the log data sent by the POS terminal 13 (step SK1).

Next, the maintenance server controller 50 acquires the store ID and POS terminal ID contained in the received log data (step SK2).

Next, the maintenance server controller 50 acquires status information data for one item that has not been processed by the operation of step SK4 described below from the status information data contained in the log data (step SK3).

Next, based on the status information data acquired in step SK3, the maintenance server controller 50 determines if the status of the corresponding log item indicates an error (step SK4).

An error means that a failure has occurred and appropriate action must be taken. The conditions for determining if the status of a log item indicates an error is predefined for each log item.

In step SK4, the maintenance server controller 50 determines, based on the status information data, if the corresponding log item satisfies a condition for determining the status of that log item is an error. If the condition is met, the maintenance server controller 50 determines the status of that log item is an error.

For example, if the log item corresponding to the status information acquired in step SK3 is RAM Usage, in step SK4 the maintenance server controller 50 executes the following process.

In this example, the condition for determining the status of the RAM usage log item indicates an error is whether the value indicating RAM usage is in a specific relationship to a specific threshold. The condition for determining whether an error occurred is, for example, that RAM usage exceeds the specific threshold, or that the rate of increase or decrease in RAM usage exceeds a specific threshold. Exceeding the threshold includes, for example, RAM usage momentarily spiking above the threshold, and RAM usage remaining above the threshold for a specific time. For the RAM usage log item, the maintenance server controller 50 determines based on the RAM usage status information data if the condition set for the RAM usage log item is met, and if met determines the status of the RAM usage log item is an error.

If in step SK4 the log item is in an error state, the maintenance server controller 50 records error management information in an error management database 511 (store system information) (step SK5).

The error management database 511 is a database storing error management information for each log item in an error state.

The error management information is information including the store ID, POS terminal ID, and status information data.

In step SK5, the maintenance server controller 50 generates error management information including the store ID and POS terminal ID acquired in step SK2, and the status information data acquired in step SK3. Next, the maintenance server controller 50 records the generated error management information in the error management database 511.

The error management information stored in the error management database 511 is deleted by a specific means when the error status of the corresponding log item in the corresponding POS terminal 13 is resolved. As a result, once an error occurs, the error management database 511 stores error management information related to the log item until the error is resolved.

After step SK5, the maintenance server controller 50 goes to step SK6.

If it is determined in step SK4 that the status of the log item corresponding to the status information data acquired in step SK3 is not an error (step SK4: NO), the maintenance server controller 50 goes to step SK6.

In step SK6, the maintenance server controller 50 determines if there is status information data for any item in the log data that has not been processed by step SK4 (step SK6). If there is unprocessed status information data (step SK6: YES), the maintenance server controller 50 returns to step SK3. If there is no unprocessed status information data (step SK6: NO), the maintenance server controller 50 ends the process.

As described above, based on error management information stored in the error management database 511, the maintenance server controller 50 of the maintenance server 17 provides useful information related to the status of the POS terminal 13 to maintenance technicians, system administrators, and other authorized people.

More specifically, the maintenance server controller 50 provides a specific user interface for inputting a POS terminal ID. A technician or other person inputs the POS terminal ID of the POS terminal 13 for which they want to get status related information. After authenticating the request, the maintenance server controller 50 acquires the POS terminal ID input to the user interface. Next, the maintenance server controller 50 retrieves the error management information identified by the acquired POS terminal ID from the error management database 511. Next, based on the status information data including the identified error management information, the maintenance server controller 50 presents information related to the corresponding log item in the user interface. By referencing the information in the user interface, the technical or other person can acquire information based on the status information data related to the log item in an error state of the identified POS terminal 13.

Other peripheral devices may also connect to the POS terminal 13. In the example shown in FIG. 3, a barcode scanner BS, customer display CD, cash drawer KS, touch panel TP, and print unit 21 are connected to the POS terminal 13 as peripheral devices.

During normal business operations, a device connected to the POS terminal 13 may also not operate normally. When this happens, the operating status of the device must be checked, and appropriate action taken based on the result.

In the network system 1 according to this embodiment, the operation of a device can be appropriately checked as controlled by the maintenance server 17, and the result of the operating check can be managed by the maintenance server 17, as a result of the client POS terminal 13 and the maintenance server 17 executing the following process.

The operation of the maintenance server 17 and the POS terminal 13 when checking the operation of a device is described below.

To check the operation of a specific POS terminal 13 and the operation of specific device connected to the specific POS terminal 13, the maintenance technician does the following. Note that the maintenance technician performs the following task when informed by the person responsible for maintenance of the store system 11 in a particular store (referred to below as the "store technician") by telephone, e-mail, fax, or other means that there may be a problem with the normal operation of a device connected to a specific POS terminal 13.

The maintenance technician starts a web browser on a specific terminal, and through the web browser accesses a specific URL on the maintenance server 17 related to displaying the POS terminal ID input interface (step S5) in FIG. 8.

Figure 11:
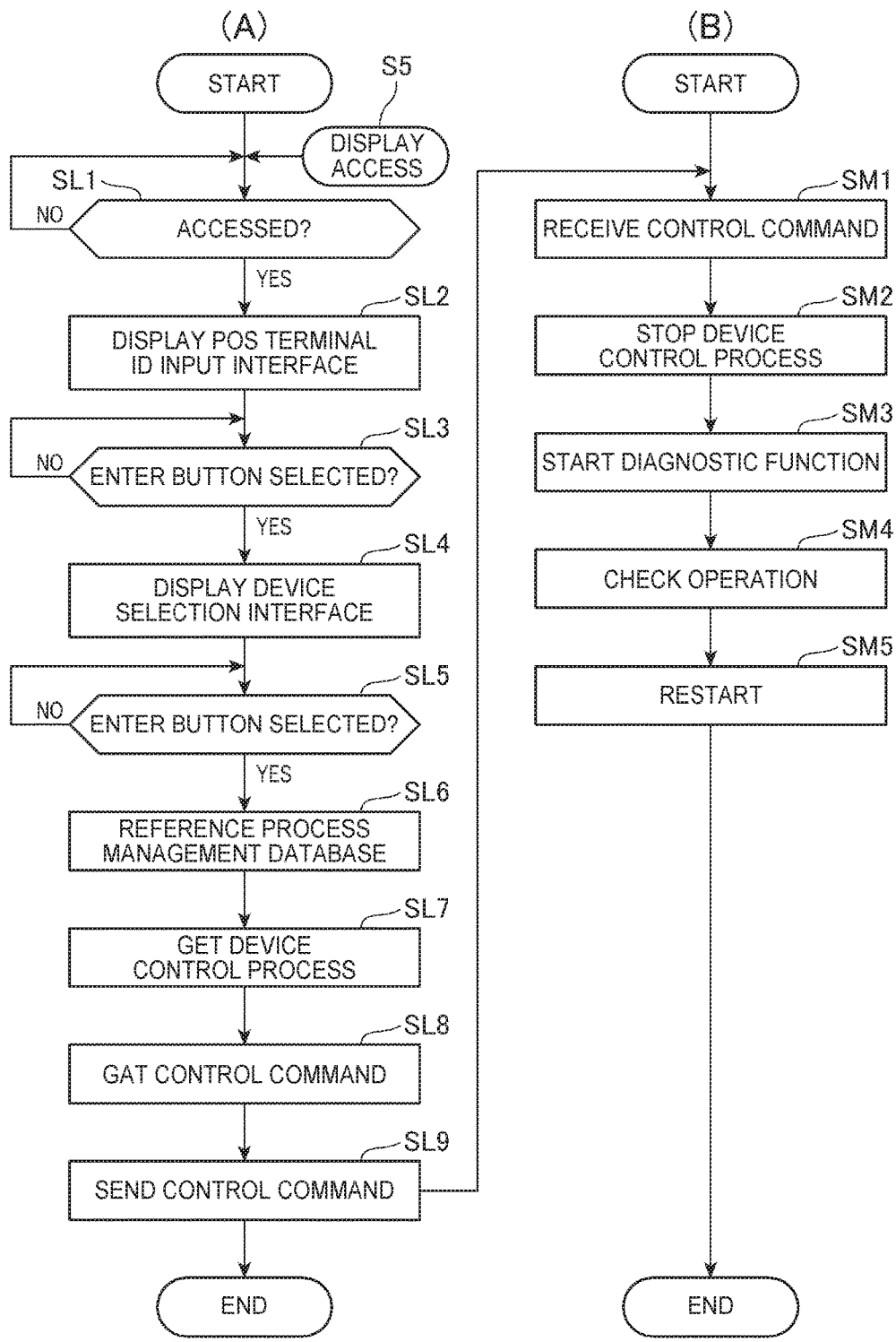
FIG. 11 is a flow chart showing an operation of the POS terminal and maintenance server.

As shown in column (A) of FIG. 11, the maintenance server controller 50 of the maintenance server 17 monitors if the specific URL was accessed (step SL1).

If the specific URL was accessed (step SL1: YES), the maintenance server controller 50 performs the required authentication, and sends the corresponding HTTP file to the terminal that accessed the URL to display the POS terminal ID input interface (step SL2).

The process of the maintenance server controller 50 sending an HTTP file to the accessing terminal and displaying the user interface on that terminal is referred to as simply the maintenance server controller 50 displaying the user interface.

Figure 12A:
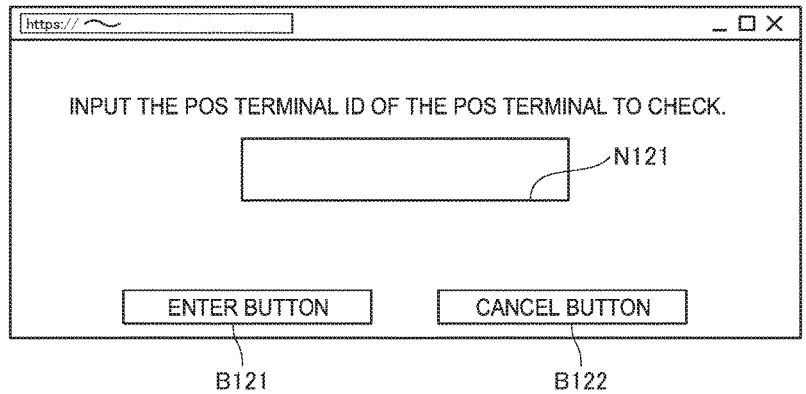
FIGS. 12A and 12B show examples of another user interface.

FIG. 12A shows an example of the POS terminal ID input interface.

As shown in FIG. 12A, the POS terminal ID input interface has a POS terminal ID input field N121. The POS terminal ID input field N121 is a field for inputting the POS terminal ID. The maintenance technician inputs the POS terminal ID of the POS terminal 13 for which to check the operation of a specific device to the POS terminal ID input field N121. The store technician informs the maintenance technician of the POS terminal ID.

The POS terminal ID input interface also has an Enter button B121 and a Cancel button B122. The Enter button B121 is a button for confirming the input, and the Cancel button B122 is a button for cancelling input.

As shown in column (A) of FIG. 11, after displaying the POS terminal ID input interface, the maintenance server controller 50 monitors whether the Enter button B121 was operated (step SL3). Note that if the Cancel button B122 is operated without operating the Enter button B121, or if the web page with the POS terminal ID input interface is closed, the maintenance server controller 50 ends the process.

If the Enter button B121 is selected (step SL3: YES), the maintenance server controller 50 displays a device selection interface (step SL4).

Figure 12B:
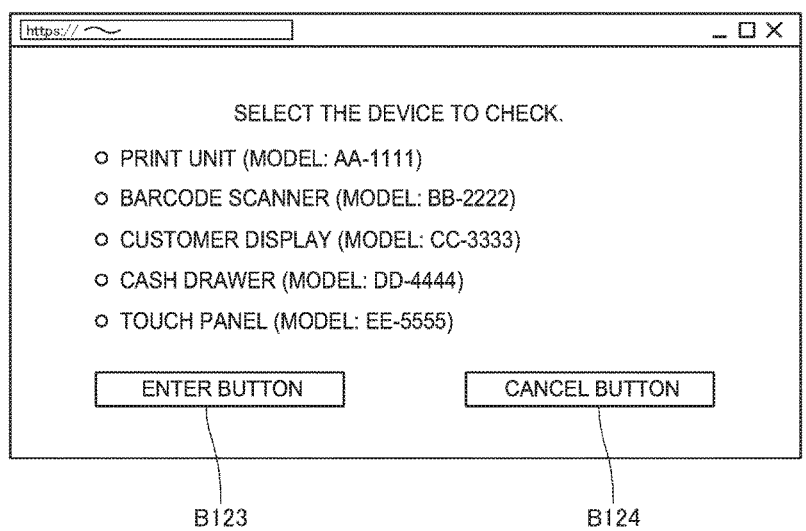

FIG. 12B shows an example of the device selection interface.

The device selection interface is a user interface enabling the maintenance technician to select the device for which to check the operation.

As shown in FIG. 12B, information identifying the devices connected to the POS terminal 13 is presented in a list. In this embodiment, the device information includes the type of device and information indicating the model, but the device information may be any information, such as device model information, identifying a particular device.

For POS terminals 13 subject to status management, the maintenance server 17 manages the type and model of each device connected to a particular POS terminal 13. More specifically, the POS terminal 13 sends information denoting the type and model of connected devices to the maintenance server 17 at specific times. The maintenance server controller 50 of the maintenance server 17 stores the device type and model information received from the POS terminal 13 relationally to the POS terminal ID of the POS terminal 13 that sent the information in a specific storage area, and manages the types and models of devices connected to that POS terminal 13.

When displaying the device selection interface, the maintenance server controller 50 gets the types and models of devices connected to the POS terminal 13 of the POS terminal ID input to the POS terminal ID input interface. The maintenance server controller 50 then displays the acquired type and model of device information in the device selection interface.

A radio button is also displayed corresponding to the type and model information for each device shown in a list in the device selection interface. The maintenance technician selects the device for which to check the operation by selecting one of the radio buttons. The store technician informs the maintenance technician of the type or model (either one) of the device to be checked.

The device selection interface also has an Enter button B123 and a Cancel button B124. The Enter button B123 confirms input, and the Cancel button B124 cancels input.

As shown in column (A) of FIG. 11, after displaying the device selection interface, the maintenance server controller 50 monitors whether the Enter button B123 is selected (step SL5). Note that if the Cancel button B124 is operated without operating the Enter button B123, or if the web page related to the device selection interface is closed, the maintenance server controller 50 ends the process.

If the Enter button B123 is selected (step SL5: YES), the maintenance server controller 50 references the process management database 512 (step SL6).

The process management database 512 is a database that relationally stores information indicating the device model with information indicating the process required to render a device control function for that model on the POS terminal 13.

The device control function of the POS terminal 13 is described next. A device control function is a function of the POS terminal 13 for controlling a device connected to the POS terminal 13. When a device control function is instantiated, a process (referred to below as a device control process) based on a device driver for the device connected to the POS terminal 13 and associated programs (referred to below as device control programs) starts. The client function unit 202 of the control device controller 20 communicates with and controls the device corresponding to the device control function by means of the instantiated device control function.

A device control function is characterized as follows. When initiated the device control function has exclusive control of the device corresponding to the device control function, and excludes control of that device by other functions (functions based on programs other than the device control program). As a result, the device is prevented from being simultaneously controlled by plural different functions, and problems resulting therefrom (such as being unable to output information input from the device to the device to which it should be output) are prevented.

Therefore, for another function to take control of a device that is already being controlled by the device control function corresponding to that device, the device control process must be stopped and the device control function stopped.

The process management database 512 relationally stores for each model of device: information denoting the model of device, and information denoting the device control process of the device control function corresponding to that model of device.

After referencing the process management database 512 in step SL6, the maintenance server controller 50 acquires from the database the information identifying the model of device selected in the device selection interface, and the device control process (or processes) related to that model (step SL7).

Next, the maintenance server controller 50 generates a control command that instructs the start of the diagnostic function (described below) corresponding to the device selected in the device selection interface, and specifies the device control process acquired in step SL7 (step SL8).

Next, the maintenance server controller 50 sends the generated control command to the POS terminal 13 (step SL9).

The maintenance server 17 manages for each POS terminal 13 the address and other information required to send data to a particular POS terminal 13.

Note that each POS terminal 13 is configured to send a request to the maintenance server 17 at a regular interval. When a request is received from a particular POS terminal 13, the maintenance server controller 50 sends the control command as a response to the request.

As shown in column (B) of FIG. 11, the control device controller 20 of the POS terminal 13 receives the control command (step SM1).

Next, the control device controller 20, based on the control command, determines whether a device control process specified by the control command was started, and if a device control process was started, stops the process (step SM2). As a result of step SM2, the device control function corresponding to the device selected by the maintenance technician (the device for which to check the operating status, referred to below as the "diagnosis target device") stops, exclusive control of the diagnosis target device by the device control function is cancelled, and control of the diagnosis target device by another function is enabled.

Next, the control device controller 20 starts the program (referred to below as the "diagnostic program") embodying the function of the diagnostic function started by the control command. In other words, the diagnostic function starts (step SM3).

The diagnostic function is a function for checking the operation of the targeted device. Checking the operation of a device with the diagnostic function is described further below.

Next, the control device controller 20 controls the diagnosis target device through the diagnostic function, and checks the operation of the diagnosis target device (step SM4). The process of step SM4 is described below using four examples: when the diagnosis target device is the print unit 21, the customer display CD, the cash drawer KS, and the touch panel TP.

When the diagnosis target device is the print unit 21, the following process is executed in step SM4.

The control device controller 20 controls the print unit 21 to execute a print test on roll paper. Next, the control device controller 20 acquires the result of the print test by a specific method, and sends the result to the maintenance server 17. Any appropriate method may be used to get the result of the print test. For example, the control device controller 20 may acquire the print test result based on the output of a specific sensor, or prompt the store technician to input information related to the result and acquire the print test result based on the input information. Next, the control device controller 20 returns the print test result to the maintenance server 17 by sending information indicating the acquired the print test result to the maintenance server 17.

The maintenance server controller 50 of the maintenance server 17 receives the information indicating the print test result, and executes a process appropriate to the received information. For example, the maintenance server controller 50 may display information indicating the print test result on a display device that can be read by the maintenance technician. As a result, the maintenance technician can know the result of the print test, and based thereon take appropriate action. For example, the maintenance technician may determine there is a problem with the print mechanism and inform the store technician so that the store technician can take action to correct the problem.

Next, the control device controller 20 controls the print unit 21 to cut the roll paper. Next, the control device controller 20 acquires the result of cutting the paper by a specific method, and sends the result to the maintenance server 17. Any appropriate method may be used to get the result of cutting the paper.

Next, the control device controller 20 returns the result of cutting the paper to the maintenance server 17 by sending the acquired information indicating the result of cutting the paper to the maintenance server 17.

The maintenance server controller 50 of the maintenance server 17 receives the information indicating the result of cutting the paper, and executes a process appropriate to the received information. For example, the maintenance server controller 50 may display information indicating the result of cutting the paper on a display device that can be read by the maintenance technician.

Operation of a device may thus be checked in steps. When device operation is checked in steps, the control device controller 20 sends the result of each step to the maintenance server 17 as each operating check is completed. As a result of this operation, the maintenance server controller 50 of the maintenance server 17 acquires the result of each step as each operational check is completed, and appropriate action can be taken.

When the diagnosis target device is the barcode scanner BS, the store technician scans a test barcode with the barcode scanner BS. The control device controller 20 acquires the result of reading the barcode with the barcode scanner BS, and sends the result to the maintenance server 17. Any appropriate method may be used to get the result of reading the barcode.

The maintenance server controller 50 of the maintenance server 17 then receives information indicating the result of reading the barcode with the barcode scanner BS, and executes a process appropriate to the received information. For example, the maintenance server controller 50 may display information indicating the result of reading the barcode with the barcode scanner BS on a display device that can be read by the maintenance technician.

When the diagnosis target device is the customer display CD, the control device controller 20 controls the customer display CD to display a test image on the customer display CD. Next, the control device controller 20 acquires the result of displaying the test image on the customer display CD, and sends the result to the maintenance server 17. Any appropriate method may be used to get the result of displaying the test image on the customer display CD.

The maintenance server controller 50 of the maintenance server 17 then receives information indicating the result of displaying the test image on the customer display CD, and executes a process appropriate to the received information. For example, the maintenance server controller 50 may display information indicating the result of displaying the test image on the customer display CD on a display device that can be read by the maintenance technician.

When the diagnosis target device is the cash drawer KS, the control device controller 20 outputs a control signal to the cash drawer KS causing the tray of the cash drawer KS to open. Next, the control device controller 20 acquires the result of opening the tray (whether or not the tray opened normally), and sends the result to the maintenance server 17. Any appropriate method may be used to get the result of opening the tray.

The maintenance server controller 50 of the maintenance server 17 then receives information indicating the result of opening the tray, and executes a process appropriate to the received information. For example, the maintenance server controller 50 may display information indicating result of opening the tray on a display device that can be read by the maintenance technician.

When the diagnosis target device is the touch panel TP, the control device controller 20 controls the touch panel TP to display a test image on the touch panel TP. Next, the control device controller 20 acquires the result of displaying the test image on the touch panel TP, and sends the result to the maintenance server 17. Any appropriate method may be used to get the result of displaying the test image with the touch panel TP.

The maintenance server controller 50 of the maintenance server 17 then receives information indicating the result of displaying the test image on the touch panel TP, and executes a process appropriate to the received information. For example, the maintenance server controller 50 may display information indicating the result of displaying the test image on the touch panel TP on a display device that can be read by the maintenance technician.

Next, the control device controller 20 displays specific information on the touch panel TP, and prompts the store technician to perform a test touch operation. The store technician then performs the test touch operation. The control device controller 20 acquires the result of the test touch operation on the touch panel TP, and sends the result to the maintenance server 17. Any appropriate method may be used to get the result of the test touch operation on the touch panel TP.

The maintenance server controller 50 of the maintenance server 17 then receives information indicating the result of the test touch operation on the touch panel TP, and executes a process appropriate to the received information. For example, the maintenance server controller 50 may display information indicating the result of the test touch operation on the touch panel TP on a display device that can be read by the maintenance technician.

Several examples of checking the device operation are described above, but the devices for which operation is checked are not limited to the foregoing, and the operation checks are also not limited to the foregoing.

After the operation checks in step SM4 are completed (if the operation check is performed in stages, after all checks are completed), the control device controller 20 reboots the POS terminal 13.

By rebooting, the initialization process executed when the POS terminal 13 starts the device control functions (that is, starts the device control program, and starts the device control process accompanying starting the device control program) corresponding at least to the connected devices that are used for normal operation. As a result, the POS terminal 13 is available for use again.

As described above, the POS terminal 13 (client) in the network system 1 according to this embodiment has a device control function for controlling a device, and a diagnostic function for checking the operation of the controlled device.

To check the operation of a device connected to the POS terminal 13, the maintenance server 17 sends a control command instructing the starting of the diagnostic function to the POS terminal 13. If a device control function is running when the received control command is received, the POS terminal 13 stops the device control function, starts the diagnostic function, checks the operation of the device with the diagnostic function, and sends the result of the operating check to the maintenance server 17.

Thus comprised, in a system in which a maintenance server 17 and a POS terminal 13 that is a client of the maintenance server 17 and has a device connected thereto communicate, device operation is checked as controlled by the maintenance server 17, and a process based on the result of the operation check is executed by the maintenance server 17.

To check the operation of a device connected to the POS terminal 13 in this embodiment of the invention, the maintenance server 17 instructs the POS terminal 13 to start the diagnostic function and sends a control command specifying one or more processes embodying the device control function. If the device control function is already executing, the POS terminal 13 stops the device control function by stopping the specified one or more processes based on the received control command.

Thus comprised, the maintenance server 17 can check the operation of a device after cancelling control of that device by the device control function.

In this embodiment of the invention, a print unit 21 with a print function is connected as a device to the POS terminal 13, and the operating check of the print unit 21 executed by the diagnostic function checks the printing operation.

Thus comprised, in a system in which a maintenance server 17 communicates with a client POS terminal 13 to which a print unit 21 is connected as a device, checking operation of the print unit 21 can be controlled by the maintenance server 17, and the maintenance server 17 can execute a process based on the result of the checked operation.

In this embodiment of the invention, checking the operation of a device by the diagnostic function of the POS terminal 13 is done in steps, and as each step in the operating check of the device is completed, the POS terminal 13 sends the result of that step to the maintenance server 17.

Thus comprised, the maintenance server 17 can get the result of each step in the operating check of a device as each step is completed, and can take appropriate action.

The POS terminal 13 is also rebooted after the checking of the operation of a device is completed.

Thus comprised, functions started by the POS terminal 13 are reinitialized by the initialization process executed during the startup process after checking device operation is completed.

The invention is described above with reference to a preferred embodiment thereof, but the invention is not limited thereto and can be modified and adapted in many ways without departing from the scope of the accompanying claims.

The store system 11 according to the invention is applied by way of example to a store system above, but the enterprises in which the store system 11 may be used are not limited to stores.

In addition, any appropriate method of communication may be used by devices in the network system 1.

In addition, the POS terminal 13 described above records by a thermal recording method in the foregoing example, but the recording method is not so limited.

The function blocks described above with reference to the figures can be embodied as desired by the cooperation of hardware and software, and do not require a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously can be used. Some functions embodied by software in the foregoing embodiment may also alternatively be embodied by hardware, and some functions embodied by hardware in the foregoing embodiment may also alternatively be embodied by software.

The invention being thus described, it will be apparent that it may be varied in many ways. Such variations are not to be regarded as a departure from the spirit and scope of the invention, and all such modifications as would be apparent to one skilled in the art are intended to be included within the scope of the following claims.

What is claimed is:

1. A network system comprising a client to which a device connects, and a server that communicates with the client, wherein:
   the client is configured to perform a device control function to control the device, and a diagnostic function to check operation of the device;
   the server sends a control command that instructs starting of the diagnostic function to the client to check the operation of the device;
   the client, based on the control command, stops the device control function if the device control function is executing, starts the diagnostic function, checks the operation of the device with the diagnostic function using a plurality of steps, returns a result of the checked operation to the server each time a step in the operation check is completed, and reboots after the operation check is completed.

2. The network system described in claim 1, wherein:
   the server sends a control command that instructs the starting of the diagnostic function and specifying a process to implement the device control function to the client to check the operation of the device connected to the client; and
   the client stops the process specified by the control command as the device control function to be stopped if the device control function is executing.

3. The network system described in claim 1, wherein:
   a print mechanism having a print function is connected to the client as the device; and
   the operation of the print mechanism checked by the diagnostic function of the client is an operation related to printing.

4. A control method of a network system including a client to which a device connects, and a server that communicates with the client, wherein:
   the client performs a device control function to control the device, and a diagnostic function to check operation of the device;

the server sends a control command instructing starting the diagnostic function to the client to check the operation of the device connected to the client; and the client, based on the received control command, stops the device control function if the device control function is executing, starts the diagnostic function, checks the operation of the device with the diagnostic function using a plurality of steps, returns a result of the checked operation to the server each time a step in the operation check is completed, and reboots after the operation check is completed.

* * * * *